United States Patent
Jones et al.

(10) Patent No.: US 11,775,679 B2
(45) Date of Patent: Oct. 3, 2023

(54) FACILITATING ENTITY RESOLUTION, KEYING, AND SEARCH MATCH WITHOUT TRANSMITTING PERSONALLY IDENTIFIABLE INFORMATION IN THE CLEAR

(71) Applicant: EQUIFAX INC., Atlanta, GA (US)

(72) Inventors: Gregory Dean Jones, Alpharetta, GA (US); Marek Ludomir Cyzio, Melbourne, FL (US); Amy Michelle Worrell, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 310 days.

(21) Appl. No.: 16/769,474

(22) PCT Filed: Jan. 8, 2019

(86) PCT No.: PCT/US2019/012599
§ 371 (c)(1),
(2) Date: Jun. 3, 2020

(87) PCT Pub. No.: WO2019/136407
PCT Pub. Date: Jul. 11, 2019

(65) Prior Publication Data
US 2020/0387634 A1 Dec. 10, 2020

Related U.S. Application Data

(60) Provisional application No. 62/614,712, filed on Jan. 8, 2018.

(51) Int. Cl.
*G06F 16/20* (2019.01)
*G06F 21/62* (2013.01)
(Continued)

(52) U.S. Cl.
CPC ...... *G06F 21/6254* (2013.01); *G06F 16/2358* (2019.01); *G06F 16/2452* (2019.01); *G06F 16/2468* (2019.01); *G06F 21/602* (2013.01)

(58) Field of Classification Search
CPC .............. G06F 21/6254; G06F 21/602; G06F 16/2468; G06F 16/2452; G06F 16/2358
See application file for complete search history.

(56) References Cited

U.S. PATENT DOCUMENTS 8,571,981 B1 * 10/2013 Laaser ................. G06Q 20/102
709/227
9,215,234 B2 * 12/2015 Black ................. H04L 63/0876
(Continued)

FOREIGN PATENT DOCUMENTS

KR 20150080533 A 7/2015

OTHER PUBLICATIONS

"Connexus 2.0", Equifax Inc., Consumer Information Solutions, EFS-728-ADV, Available Online at: https://www.equifax.com/pdfs/corp/EFS-728-ADV-Connexus-2_0-Prod-Sheet.pdf, May 2008, 2 pages.
(Continued)

*Primary Examiner* — Tarek Chbouki
(74) *Attorney, Agent, or Firm* — Kilpatrick Townsend & Stockton LLP

(57) ABSTRACT

In some aspects, an entity-resolution computing system for entity resolution is provided. The entity-resolution computing system includes an entity-resolution server configured for correlating data objects from an identity data repository that contains account or transaction data for entities based on the data objects including a common portion of the account or transaction data. The entity-resolution server updates the identity data repository to include an entity identifier that links the data objects and indicates that the data objects refer
(Continued)

to a common entity. The entity-resolution server creates an entity-resolution data structure having the data objects with the entity identifier and a new variant data object containing a modified version of account or transaction data that match the common entity. The entity-resolution server encrypts the entity-resolution data structure and causes the encrypted entity-resolution data structure to be transmitted to a client computing system for use in augmenting client data.

18 Claims, 5 Drawing Sheets

(51) Int. Cl.
*G06F 16/2458* (2019.01)
*G06F 16/2452* (2019.01)
*G06F 16/23* (2019.01)
*G06F 21/60* (2013.01)

(56) References Cited

U.S. PATENT DOCUMENTS

| | | | |
|---|---|---|---|
| 11,157,954 B1* | 10/2021 | Belanger | G06Q 30/0201 |
| 2002/0178394 A1 | 11/2002 | Bamberger et al. | |
| 2008/0052527 A1* | 2/2008 | Siedlarz | G06F 21/32 713/186 |
| 2008/0189363 A1* | 8/2008 | Tian | H04L 69/24 709/221 |
| 2009/0150128 A1* | 6/2009 | Zhang | G06Q 20/10 703/2 |
| 2010/0211593 A1 | 8/2010 | Skurtovich et al. | |
| 2011/0119291 A1 | 5/2011 | Rice | |
| 2013/0060869 A1 | 3/2013 | Davis et al. | |
| 2013/0204886 A1 | 8/2013 | Faith et al. | |
| 2014/0278857 A1* | 9/2014 | Bergman | G06Q 30/0211 705/14.13 |
| 2014/0289188 A1* | 9/2014 | Shimanovsky | G06F 16/2386 707/609 |
| 2016/0154859 A1 | 6/2016 | Skurtovich, Jr. et al. | |
| 2016/0373456 A1* | 12/2016 | Vermeulen | G06F 16/9024 |
| 2018/0218173 A1* | 8/2018 | Perkins | G06F 21/6254 |
| 2018/0276344 A1* | 9/2018 | Cochran | G16H 40/20 |
| 2019/0075198 A1* | 3/2019 | Gaillard | H04M 3/42042 |
| 2019/0081979 A1* | 3/2019 | Li | H04L 9/3226 |
| 2019/0171655 A1* | 6/2019 | Psota | G06F 16/2379 |

OTHER PUBLICATIONS

"Consumer Credit Reports from Equifax: Relevant Consumer Data for Faster, More Informed Decisions", Equifax Inc., EFS-002-ADV, Available Online at: https://www.equifax.com/ePort/pdfs/ConsumerCreditProducts.pdf, Feb. 2007, 4 pages.
"National Consumer Telecom & Utilities Exchange", Equifax Inc., Available Online at: https://assets.equifax.com/assets/usis/nctue_plus_ps.pdf, 2016, 2 pages.
"The Work Number Direct for Employers", Workforce Solutions, Available Online at: https://www.equifax.com/assets/WFS/direct-for-employers.pdf, 2016, 1 page.
PCT/US2019/012599, "International Search Report and Written Opinion", dated Apr. 24, 2019, 12 pages.
European Patent Application No. 19735768.4, "Extended European Search Report", dated Jul. 15, 2021, 8 pages.
European Patent Application No. 19735768.4, "Office Action", dated Nov. 4, 2022, 8 pages.
International Application No. PCT/US2019/012599, "International Preliminary Report on Patentability", dated Jul. 23, 2020, 8 pages.

\* cited by examiner

FACILITATING ENTITY RESOLUTION, KEYING, AND SEARCH MATCH WITHOUT TRANSMITTING PERSONALLY IDENTIFIABLE INFORMATION IN THE CLEAR

CROSS REFERENCE TO RELATED APPLICATIONS

This claims priority to U.S. Provisional Application No. 62/614,712, entitled "Facilitating Entity Resolution, Keying, and Search Match Without Transmitting Personally Identifiable Information In The Clear," filed on Jan. 8, 2018, which is hereby incorporated in its entirety by this reference.

TECHNICAL FIELD

This disclosure relates generally to computers and digital data processing systems for facilitating entity resolution with database records while ensuring cybersecurity.

BACKGROUND

Electronic transactions involve exchanges of data among different, remotely located parties via one or more online services. Such entities may possess valuable databases that contain transactions and information relating to such products and services. But databases may be incomplete or inaccurate. For example, a database object may list "Gregory Jones" in a name field, but the individual to whom the object refers may also use another name such as "Greg Jones," resulting in an incomplete object.

For example, a first entity may have a valuable database with entries generated from transactions related to products and services. A second entity may have a second database from a separate set of transactions or a second source, but the objects in the second database may be fragmented and therefore not useful. Fragmentation may include a data object within the second database not having a complete set of fields or not referring to variants such as alternative names and addresses. Accordingly, the second entity may wish to validate or augment its database with that of the first entity to increase the robustness of the data.

But sharing the second database with the first entity in order for the first entity to validate or augment the database may not be an option because the second database contains personally identifiable information and is viewed as a business asset. The first entity may not wish to share the first database with the second entity for the same reasons. Moreover, transmitting database entries over a network connection can also be problematic due to the databases including personally identifiable information that may be intercepted or received by unintended recipients.

SUMMARY

Various embodiments of the present disclosure provide entity resolution by resolving database structures through correlating data objects based on variants and securely sharing the resolved database structures. In one example, an entity-resolution computing system includes an entity-resolution server that can correlate two data objects, wherein one of the data objects is from an identity data repository that contains account or transaction data for entities. The entity-resolution server can correlate the two data objects based on the first and second data objects including a common portion of the account or transaction data. The entity-resolution server can update the identity data repository to include an entity identifier that links the first data object to the second data object. The entity identifier that indicates that the first data object and the second data object refer to a common entity.

Continuing with this example, the entity-resolution server creates an entity-resolution data structure from the updated identity data repository. The entity-resolution data structure can include the first and second data objects having the entity identifier. The entity-resolution server can update the entity-resolution data structure to generate a new variant data object. The new variant data object contains a modified version of account or transaction data that match the common entity. The entity-resolution server can generate an encrypted entity-resolution data structure by encrypting the updated entity-resolution data structure. The entity-resolution computing system can transmit, via a client external-facing device, the encrypted entity-resolution data structure to a client computing system to augment client data.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
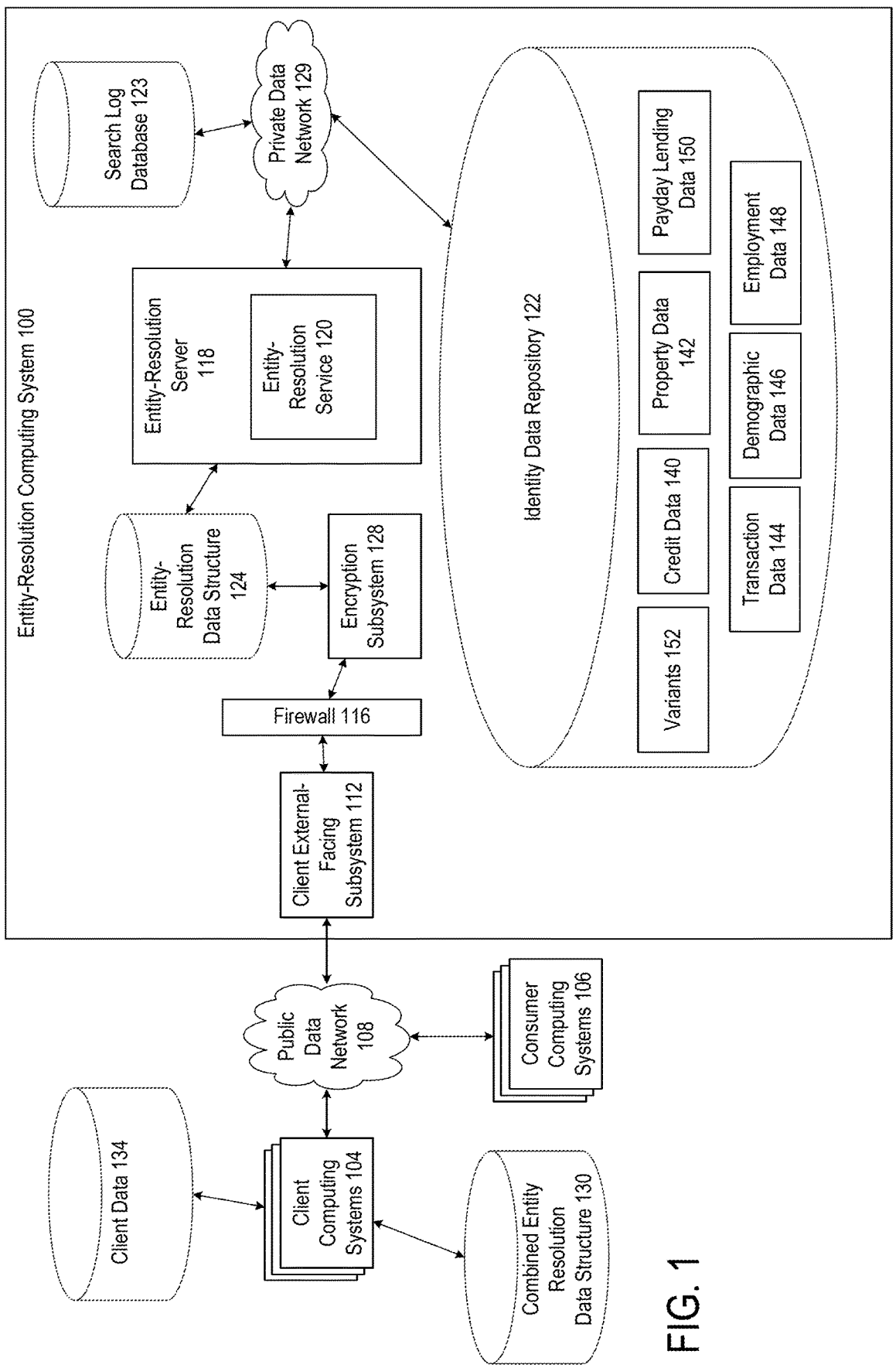
FIG. 1 is a block diagram depicting an example of a computing environment in which an entity-resolution computing system can securely combine and share database records according to certain aspects of the present disclosure.

Certain aspects and features of the present disclosure involve entity resolution by resolving database structures by correlating data objects based on variants and securely sharing the resolved database structures. Entity resolution refers to the process of disambiguating records that correspond to the same entity. Disambiguation can be accomplished, for example by linking or grouping records together. In particular, certain aspects of the present disclosure increase the robustness of a database by updating data structures with variant data objects that are associated with the same entity. And updated data structures can be securely indexed and shared with client computing systems to facilitate the integration of such data structures with client databases.

Some aspects can address difficulties presented with conventional techniques. For example, businesses develop and use valuable databases that contain transactions and information relating to users of the business's products and services. Augmentation of a first database with data from a second database can be desirable if the first database does not represent a complete picture of an individual or entity. But augmenting a database with millions of records can be time-consuming and difficult. Additionally, due to cybersecurity and privacy concerns, owners of such databases may be hesitant to share database records with other entities for fear that personal information can be exposed in transit, or that the other entity will copy the entire database. To address this problem, some other techniques involve encrypting an entire database before transmission. This prevents the exposure of personally identifiable information in transit, but the database, once decrypted, can be copied in entirety by the receiving entity. Furthermore, this solution also does not solve the problem of easily merging large quantities of information.

Certain aspects described herein overcome the limitations of previous solutions by matching data objects that refer to the same entity, encrypting and hashing such data objects on an individual basis, and transmitting the objects to a receiving device such as a client computing device. The receiving device may augment an existing database by using the index for an existing record in the database, thereby improving accuracy and completeness. But the receiving device can only access the records for which the receiving system has an index, i.e., a matching record. Also, because hashed and encrypted data cannot easily be read in transit, personally identifiable information remains protected.

In some aspects, an entity-resolution server correlates two data objects. The data objects can have different fields such as name, social security number, address, driver's license number, etc. The entity-resolution server correlates the first and second objects by identifying one or more fields that are sufficiently similar between the first and second objects, such as social security number or driver's license number. For example, the entity-resolution server can correlate a first data object with the name "Gregory Jones" from an identity data repository with a second object with the name "Gregory Dean Jones" based on the first data object and second data objects having the same social security number. The entity-resolution server can correlate objects based on a less than identical field match between objects.

The entity-resolution server can update the data structure by generating a new variant data object. Variant data objects include objects identified through user device interactions as referring to the same entity. For example, the entity-resolution server may determine that a previous search from a user device for "Gregory Jones" included in a result "Gregory Dean Jones" that was accepted by the user device. The entity-resolution server may create a variant data object with the entry "Gregory Dean Jones" and link the variant data object with the object "Greg Jones."

Variant data objects can also include well-known variations in identifiers such as common short names or nicknames. For example, the entity-resolution server may create a variant data object with the entry "Greg Jones" based on "Greg" being a common nickname for "Gregory," and may link the variant data object with the object "Gregory Jones."

The entity-resolution server can encrypt and hash the data structure, which can generate an index to be used by a client device to match a client data object with the data structure. The entity-resolution server can provide the data structure to a client-external facing subsystem via a firewall to ensure security.

As described herein, certain embodiments provide improvements to online computing environments by solving problems that are specific to online platforms and through utilizing automated models that are uniquely suited for securely augmenting data in online computing environments. For example, the disclosures presented herein presents a particular solution to the problem through correlating data objects that refer to the same entity, encrypting and hashing such data objects to generate an index so that the receiving device may augment a database by using the index for an existing record in the database. This particular way of correlating, encrypting, and indexing data objects allows both data augmentation and data security to be achieved in data transmission and the augmentation process.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Entity Resolution Computing Service

FIG. 1 is a block diagram depicting an example of an operating environment in which an entity-resolution computing system can securely combine and share database records. FIG. 1 depicts examples of hardware components of an entity-resolution computing system 100, according to some aspects. The entity-resolution computing system 100 is a specialized computing system that may be used for processing large amounts of data using a large number of computer processing cycles.

The number of devices depicted in FIG. 1 are provided for illustrative purposes. Different numbers of devices may be used. For example, while certain devices or systems are shown as single devices in FIG. 1, multiple devices may instead be used to implement these devices or systems.

Entity-resolution computing system 100 includes an entity-resolution server 118 that operates an entity-resolution service 120, a private data network 129, identity data repository 122, entity-resolution data structure 124, firewall 116, and client external-facing subsystem 112.

Entity-resolution server 118 can create one or more entity-resolution data structures 124 by correlating objects from identity data repository 122. Identity data repository 122 can contain different kinds of data including accounts or transaction data regarding entities such as from purchases of products or services, sales data, credit data such as loan applications or credit card transactions. For example, identity data repository 122 can include credit data 140, property data 142, transaction data 144, demographic data 146, employment data 148, or payday lending data 150. Identity data repository 122 can contain variants 152. Variants can include commonly used nicknames of a particular name, or equivalencies derived from transactions with user devices. Variants can be based on historical search terms such as synonyms or misspellings, such as "disappear," "dissappear," or "dissapear." Entity-resolution server 118 can connect to search log database 123 to retrieve previously searched terms and create variants from the searched terms.

The identity data repository 122 can include internal databases or other data sources that are stored at or otherwise accessible via the private data network 129. Identity data repository 122 can include consumer identification data. Consumer identification data can include any information that can be used to uniquely identify an individual or other entity. In some aspects, consumer identification data can include information that can be used on its own to identify an individual or entity. Non-limiting examples of such consumer identification data include one or more of a legal name, a company name, a social insurance number, a credit card number, a date of birth, an e-mail address, etc. In other aspects, consumer identification data can include information that can be used in combination with other information to identify an individual or entity. Non-limiting examples of such consumer identification data include a street address or other geographical location, employment data, etc.

The entity-resolution computing system 100 can communicate with various other computing systems such as client computing systems 104. For example, the entity-resolution computing system 100 may include one or more provider external-facing devices that communicate with data provider systems for receiving the account or transaction data regarding entities that are stored in the identity data repository 122. The entity-resolution server 118 may also communicate with the client computing system 104 by way of the encryption subsystem 128 and client external-facing subsystem 112.

The encryption subsystem 128 can provide a variety of encryption and hashing techniques to entity-resolution data structure 124. For example, encryption subsystem 128 can hash entity-resolution data structure 124 using the Secure Hash Algorithm (SHA) to ensure that the entity-resolution data structure 124 is not read in transit over the public data network 108 to the client computing system 104.

The client computing systems 104 may interact, via one or more public data networks 108, with various external-facing subsystems of the entity-resolution computing system 100. For instance, an individual can use a client computing system 104 to access the client external-facing subsystem 112. The client external-facing subsystem 112 can selectively prevent a client computing system 104 from accessing databases such as the search log database 123, the identity data repository 122, or the entity-resolution data structure 124. For example, the client external-facing subsystem 112 can determine whether a client computing system 104 can access the databases based on an identifier of the client computing system and a record stored in a secure location in the client external-facing subsystem 112, such as a memory in a basic input output system (BIOS) of the client external-facing subsystem 112. The record indicates that the access permission of a client computing device and can be determined based on various factors such as whether the client computing system is an authorized system to access a certain database, whether the timing of the access is within an authorized window and so on.

To determine if a client computing system 104 can access a certain database, the client external-facing subsystem 112 retrieves the record associated with the client computing system 104 from the secure location and encrypts the record and other associated data using a cryptographic key. Similarly, the client external-facing subsystem 112 encrypts the record submitted by the client external-facing subsystem 112 using the same cryptographic key to determine a match. A match indicates that the client computing system 104 can access the database. The client external-facing subsystem 112 prevent the client computing system 104 from accessing the databases if there is no match.

The client external-facing subsystem 112 may also interact with consumer computing systems 106 via one or more public data networks 108 to facilitate electronic transactions between users of the consumer computing systems 106 and online services provided by the client external-facing subsystem 112. Each external-facing subsystem can include one or more computing devices that provide a physical or logical subnetwork (sometimes referred to as a "demilitarized zone" or a "perimeter network") that expose certain online functions of the entity-resolution computing system 100 to an untrusted network, such as the Internet or another public data network 108.

For instance, an individual can use a consumer computing system 106, such as a laptop or other end-user device, to access an online service hosted by a client computing system 104. An electronic transaction between the consumer computing system 106 and the client external-facing subsystem 112 can include, for example, the consumer computing system 106 being used to submit an online credit card application or other digital application to the client external-facing subsystem 112 via the online service. The client external-facing subsystem 112 can provide the transaction information to the entity-resolution server 118 for storage in the identity data repository 122. Such transaction information can be used to create variant data.

The client external-facing subsystem 112 can be communicatively coupled, via a firewall 116, to one or more computing devices forming a private data network 129. The firewall 116, which can include one or more devices, can create a secured part of the entity-resolution computing system 100 that includes various devices in communication via the private data network 129. In some aspects, by using the private data network 129, the entity-resolution computing system 100 can house the identity data repository 122 in an isolated network (i.e., the private data network 129) that has no direct accessibility via the Internet or another public data network 108.

Each client computing system 104 may include one or more third-party devices, such as individual servers or groups of servers operating in a distributed manner. Client computing system 104 can include any computing device or group of computing devices operated by a seller, lender, or other provider of products or services. Client computing system 104 can include one or more server devices. The one or more server devices can include or can otherwise access one or more non-transitory computer-readable media. The client computing system 104 can also execute an online service. The online service can include executable instructions stored in one or more non-transitory computer-readable media. The client computing system 104 can further include one or more processing devices that are capable of executing the online service to perform operations described herein. In some aspects, the online service can provide an interface (e.g., a website, web server, or other server) to facilitate electronic transactions involving a user of a consumer computing system 106. The online service may transmit data to and receive data from the consumer computing system 106 to enable a transaction.

Each communication within the entity-resolution computing system 100 may occur over one or more data networks, such as a public data network 108, a private data network 129, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

A data network may include network computers, sensors, databases, or other devices that may transmit or otherwise provide data to entity-resolution computing system 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

The entity-resolution computing system 100 can include one or more entity-resolution servers 118. The entity-resolution server 118 may be a specialized computer or other machine that processes the data received within the entity-resolution computing system 100. The entity-resolution server 118 may include one or more other systems. For example, the entity-resolution server 118 may include a database system for accessing the network-attached storage unit, a communications grid, or both. A communications grid may be a grid-based computing system for processing large amounts of data.

The entity-resolution server 118 can include one or more processing devices that execute program code, such as entity-resolution service 120 or encryption subsystem 128. The program code can be stored on a non-transitory computer-readable medium. The entity-resolution service 120 can execute one or more processes for resolving different entities.

In some aspects, the entity-resolution service 120 can include one or more modules, such as a web server module, a web services module, or an enterprise services module, which individually or in combination facilitate electronic transactions. For example, a web server module can be executed by a suitable processing device to provide one or more web pages or other interfaces to a client computing system 104, or a consumer computing system 106. Based on the interactions, the entity-resolution server 118 can determine common variants such as nicknames.

The entity-resolution computing system 100 may also include one or more network-attached storage units on which various repositories, databases, or other data structures are stored. Examples of these data structures are the identity data repository 122. Network-attached storage units may store a variety of different types of data organized in a variety of different ways and from a variety of different sources. For example, the network-attached storage unit may include storage other than the primary storage located within entity-resolution server 118 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

In some aspects, the entity-resolution computing system 100 can implement one or more procedures to secure communications between the entity-resolution computing system 100 and other client systems. Non-limiting examples of features provided to protect data and transmissions between the entity-resolution computing system 100 and other client systems include secure web pages, encryption, firewall protection, network behavior analysis, intrusion detection, etc. In some aspects, transmissions with client systems can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

Examples of Entity Resolution Operations

The entity-resolution computing system 100 can execute one or more processes to perform entity resolution, specifically correlating objects that refer to the same entity into a data structure and providing the data structure to client computing systems 104.

Figure 2:
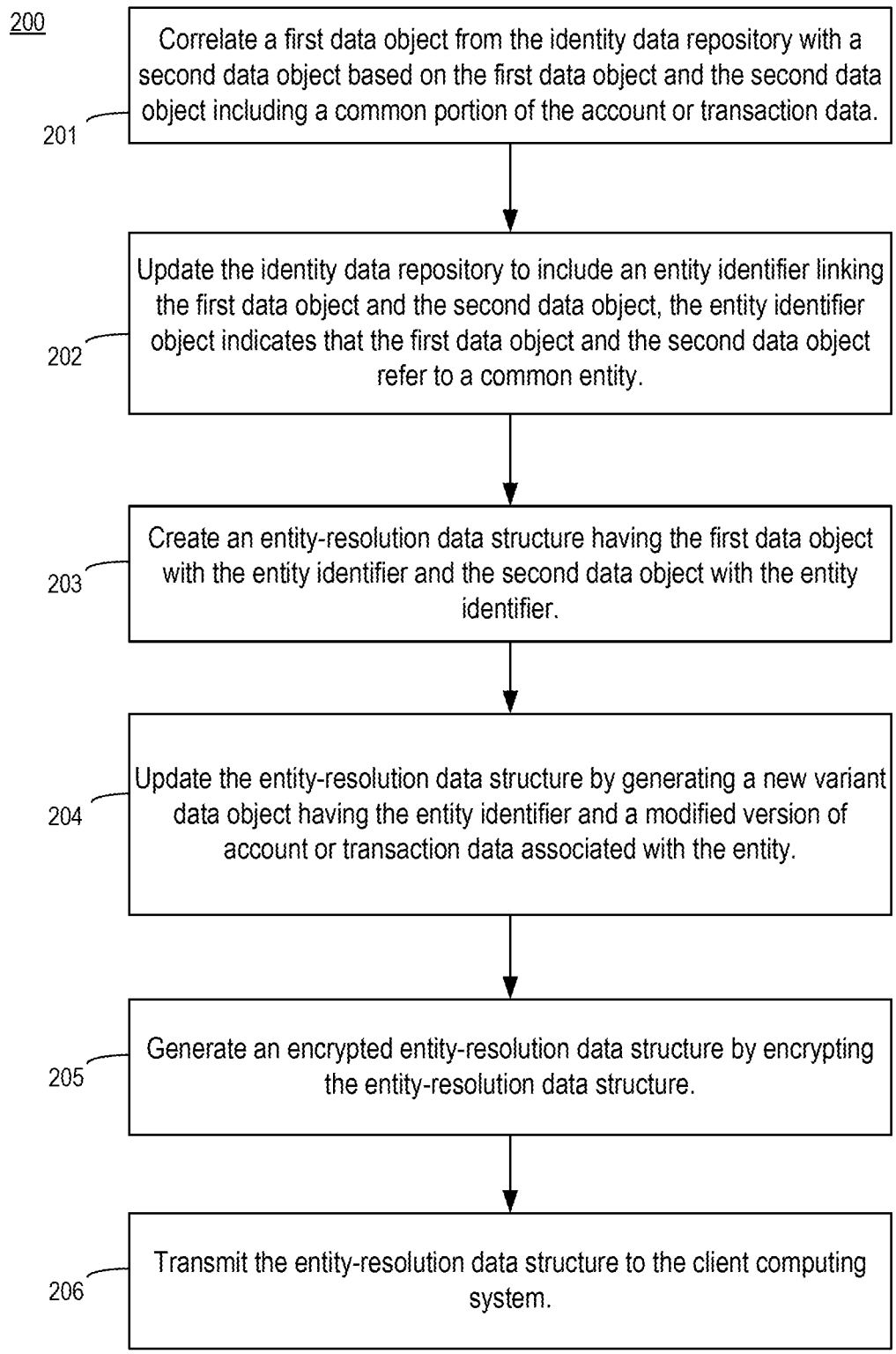
FIG. 2 is a flowchart depicting an example of a process for performing entity resolution through correlating data objects based on variants according to certain aspects of the present disclosure.

FIG. 2 is a flowchart illustrating an example of a process 200 for performing entity resolution based on correlating objects based on variants. For illustrative purposes, the process 200 is described with reference to implementations described above with respect to one or more examples described herein. Other implementations, however, are possible. In some aspects, the steps in FIG. 2 may be implemented in program code that is executed by one or more computing devices such as the entity-resolution server 118 depicted in FIG. 1. In some aspects of the present disclosure, one or more operations shown in FIG. 2 may be omitted or performed in a different order. Similarly, additional operations not shown in FIG. 2 may be performed.

At block 201, the process 200 involves correlating a first data object from the identity data repository with a second data object based on the first data object and the second data object including a common portion of the account or transaction data. As discussed, identity data repository 122 can contain different types of data such as credit data 140 or property data 142. In an example, entity-resolution service 120 correlates a first data object obtained from credit data 140 with a second data object obtained with property data 142.

Figure 3:
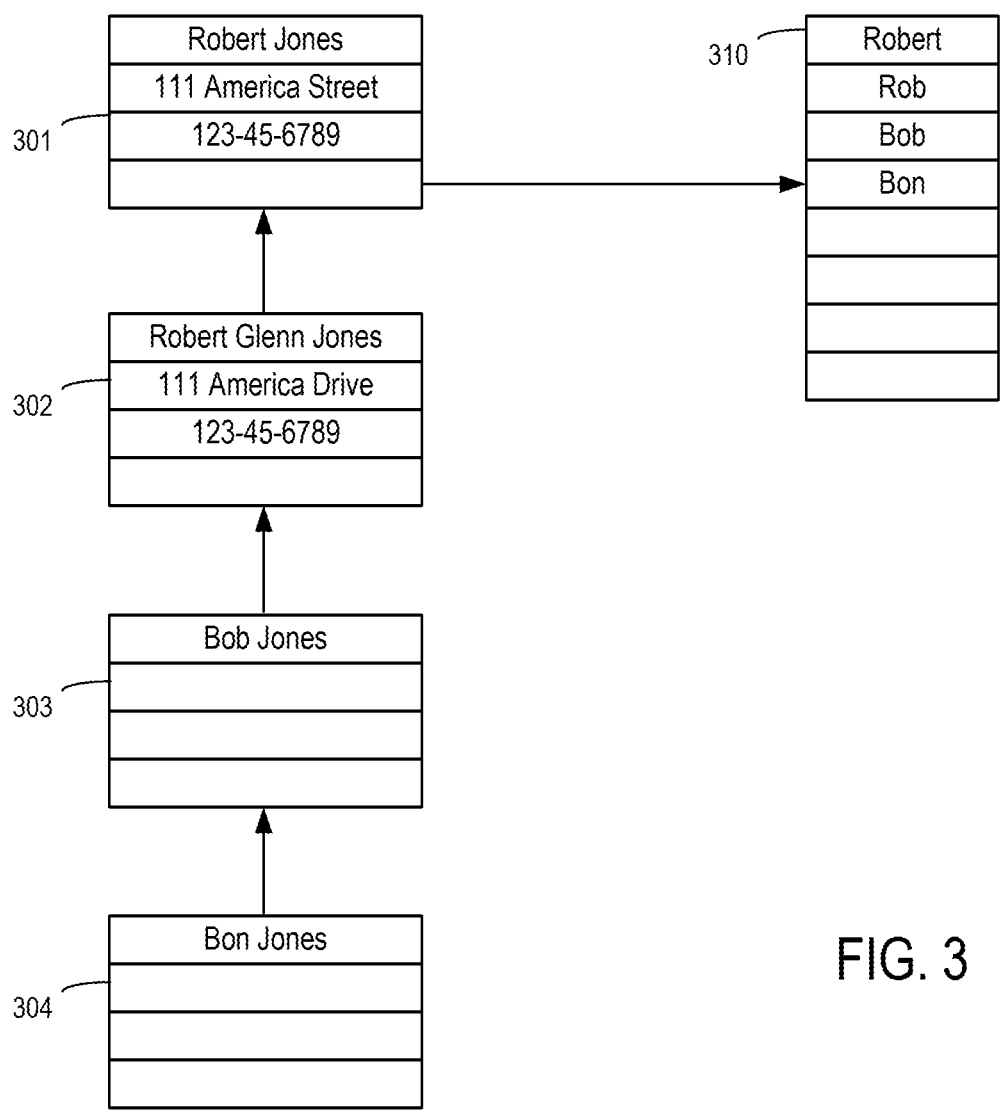
FIG. 3 is a diagram depicting examples of data objects that are correlated by the entity-resolution computing device according to certain aspects of the present disclosure.

FIG. 3 is a diagram depicting examples of data objects that are correlated by the entity-resolution computing device. FIG. 3 depicts data objects 301, 302, 303, 304, and 310. Data objects 301-304 represent objects that the entity-resolution server 118 determines to refer to the same entity, for example by using process 200. Data object 310 represents a combination, or a linking together, of some or all of data objects 301-304.

Data object 301 contains fields "Robert Jones," "111 America Street," and a numerical value such as a social security number 123-45-6789. Data object 301 may be derived from credit information. Data object 302 contains a field "Robert Glenn Jones," field "111 America Drive," and a numerical value such as a social security number 123-45-6789.

Entity-resolution service 120 correlates a first data object, e.g., data object 301, with a second data object, e.g., data object 302. Different algorithms and methods can be used to correlate data objects 301 and 302 including "fuzzy matching" or machine learning techniques. Fuzzy matching can find correspondences between records that contain text and numerical values that do not match perfectly and therefore would not match under a stricter method.

For example, entity-resolution service 120 can determine that the data objects 301 and 302 refer to the same entity because the address varies by only one word, e.g. "Street" versus "Drive" Other algorithms are possible. Fuzzy matching also allows for matching two records that include a numerical value such as a social security or driver's license number that differs by one digit, by otherwise validating the match.

Returning to FIG. 2, at block 202, the process 200 involves updating the identity data repository to include an entity identifier linking the first data object and the second data object. The entity identifier indicates that the first data object and the second data object refer to a common entity. Linking refers to the addition of a reference from one data object to another data object. With the first data object linked to the second data object, the entity-resolution service 120 can provide the correlated objects upon request.

At block 203, process 200 involves creating an entity-resolution data structure having the first data object with the entity identifier and the second data object with the entity identifier. Entity-resolution server 118 creates a new data structure, entity-resolution data structure 124 that includes the first and second data objects. For example, as shown in FIG. 3, data object 310 includes entries from data objects 301 and 302.

In some aspects, block 202 may be repeated for several, or a batch, of objects, before block 203 is completed. Different implementations are possible.

At block 204, process 200 involves updating the entity-resolution data structure 124 by generating a new variant data object having the entity identifier and a modified version of account or transaction data associated with the entity. In some aspects, the modified version of the account or transaction data is absent from the identity data repository.

Variant objects can be determined based on different methods. For example, variant objects can be empirically determined by user device interactions with the entity-resolution server 118 or by some user device interactions with some other server, e.g., connected via private data network 129.

In some aspects, entity-resolution server 118 receives transaction information generated by interactions with user devices and generates variant objects based on that transaction information. A user device interacts with entity-resolution server, for example, by performing a search for a particular name or address. The entity-resolution server 118 returns a list of matches. Based on the selection received by the user device and sent to the server, the server learns that a particular search result may correspond to the original query. Similarly, based on a selection rejected by a user device, the entity-resolution server 118 learns that two objects do not match. For example, even though "Greg" is short for "Gregory," if a user device rejects a particular match "Greg H. Jones" for a search for "Gregory Jones Atlanta," then the entity-resolution server 118 learns that those two entities do not match despite one match containing the nickname of the other.

For example, a user device submits a query for "Greg Jones." The entity-resolution server returns a list of search results that include "Gregory H. Jones." The user device selects this entry. The entity-resolution server 118 has learned that "Greg Jones" is also called "Gregory H. Jones," and creates a variant. User queries may be maintained in the search log database 123.

Variant objects can also be determined based on conventions, shorthand, or slang of a spoken or written language. For example, the entity-resolution server 118 maintains a list of common nicknames. For example, "Meg" may be short for "Meghan," "Steve" may be short for "Stephen," and "Bob" may be short for "Robert." Based on this variant list, entity-resolution server 118 can automatically create variants for entries in the identity data repository. For example, object 303 represents a common variant to objects 301 and 302. Object 303 includes a field "Bob Jones" which entity-resolution server 118 has linked to objects 302 and 301.

Variant objects can also be determined based on common misspellings or typing errors such as "fat finger" errors. For example, a person manually entering data may type "Bon" instead of "Bob," due to the fact that the "n" key is adjacent to the "b" key. Such an error may propagate through computing systems and persist, causing two objects to exist for the same entity "Bob." Object 304 is an example data object that includes the name field "Bon Jones." Entity-resolution server 118 can maintain a list of common errors and link objects accordingly. For example, entity-resolution computing system 118 has linked object 304 to data object 303, data object 302, and data object 301.

The entity-resolution server 118 can also use linguistics to apply common synonyms or abbreviations from one name to another name. For example, entity-resolution server can determine that the name "Maggie" is short for "Margaret," and deduces that "Robbie" may be short for "Robert." Entity-resolution server 118 can, therefore, create new objects with the name "Robbie" for objects that have the name "Robert."

In some aspects, the entity-resolution server 118 creates a new data object 310 that is the combination of all objects and variants that refer to a particular entity.

At block 205, process 200 involves generating an encrypted entity-resolution data structure by encrypting the entity-resolution data structure 124. For example, entity-resolution server 118 provides an entity-resolution data structure 124 to encryption subsystem 128. Encryption subsystem 128 encrypts and hashes the entity-resolution data structure 124.

In order to access the data within the entity-resolution data structure 124, the client computing system 104 knows the index and a decryption key. The client computing system 104 can request an encryption key from the entity-resolution server 118.

At block 206, process 200 involves transmitting the entity-resolution data structure to the client computing system. The encryption subsystem 128 provides the encrypted entity-resolution data structure 124 to the client external-facing subsystem 112 via the firewall 116. The client computing system 104 can access the entity-resolution data structure from the client external-facing subsystem 112.

Either manually or periodically, client computing system 104 can obtain an updated entity-resolution data structure 124. The update can be triggered based on a request from a client computing system 104 or from the entity-resolution server 118. The data structure can be delivered by any mechanism, such as by encrypted file, secure upload, secure file transfer protocol, or by the physical medium. In some aspects, the client computing system 104 obtains a new decryption key from the entity-resolution server 118.

Use of Entity-Resolution Data Structure

Client computing system 104 can use the entity-resolution data structure 124 in a variety of manners. Client computing system 104 can combine or augment client data 134 with the entity-resolution data structure 124 to create a combined entity-resolution data structure 130.

Client computing system 104 can combine client data 134 with the entity-resolution data structure 124 by hashing and indexing client data 134 then combining the hashed data with the hashed entity-resolution data structure 124. An index can be any identifying characteristic, e.g., full name and address, or name and some digits of a numerical value such as a social security number.

For example, as shown with respect to FIG. 3, client computing system 104 combines data object 310 with an existing data object within client data 134, for example, "Bobby Jones" and creates an augmented data object. The role of the entity-resolution data structure is to indicate the data objects that are allowed to be combined with the client data to generate the augmented data object. This is implemented by encrypting or hashing the entity-resolution data structure using an encryption key. In order for a computing system to verify authorization to combine the data object 310 with an existing data object within the client data 134, the client data is retrieved and hashed in a similar way. The hashed client data and the hashed entity-resolution data structure 124 are compared to determine if there is a match. If there is no match, then the data object 310 cannot be combined with the data object within the client data 134 to generate the augmented data object.

Figure 4:
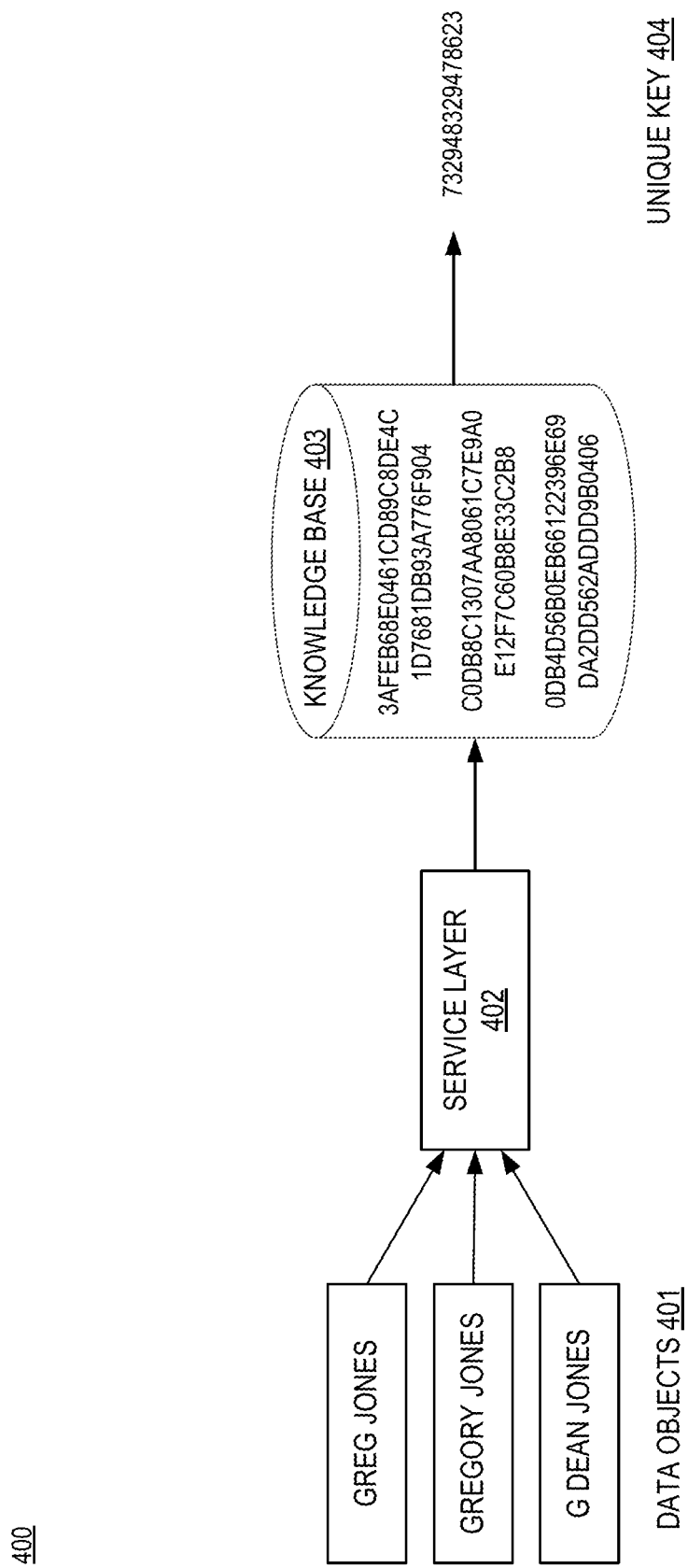
FIG. 4 is a diagram depicting an example of information flow for an entity-resolution computing system according to certain aspects of the present disclosure.

FIG. 4 depicts an example information flow for an entity-resolution computing system. Environment 400 includes data objects 401, service layer 402, knowledge base 403, and a unique key 404. As described herein, entity-resolution server 118 combines or links data objects that refer to the same entity, such as data objects 401 "Greg Jones," "Gregory Jones," and "G Dean Jones" into one data object such as entity-resolution data structure 124. Data objects can include variants such as common misspellings, "fat finger" mistyped words, or other variants gathered from search queries, e.g., via search log database 123. Service layer 402, implemented by encryption subsystem 128, encrypts and hashes the data object into an entity-resolution data structure 124 such as knowledge base 403, which can be provided to a client computing system 104. Each encrypted and hashed entity-resolution data structure can have a unique key 404, which is used to by client computing system 104 to combine or integrate client data 134.

Example of Computing Environment for Synthetic Identity Detection Service

Figure 5:
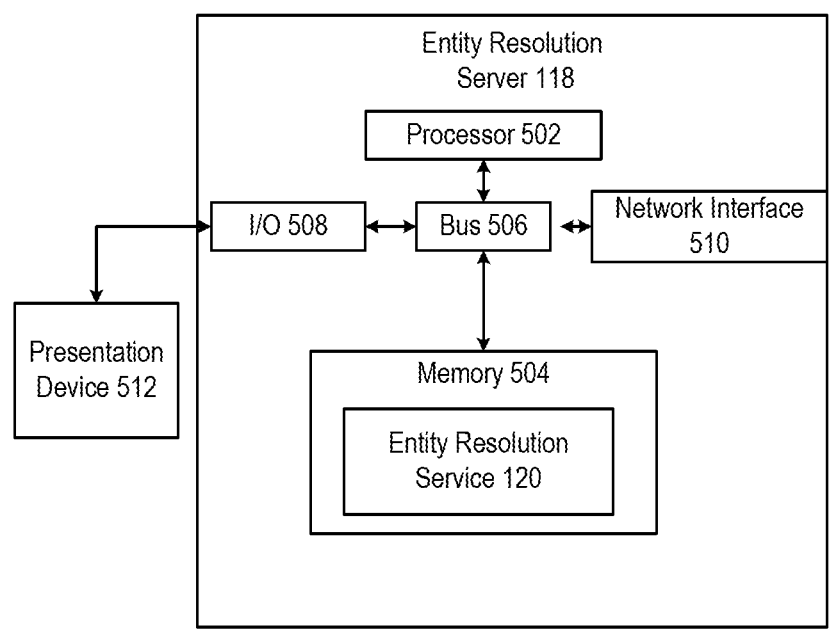
FIG. 5 is a block diagram depicting an example of a computing system suitable for implementing aspects of the techniques and technologies presented herein.

Any suitable computing system or group of computing systems can be used to perform the operations for detecting synthetic identities described herein. For example, FIG. 5 is a block diagram depicting an example of an entity-resolution server 118. The example of the entity-resolution server 118 can include various devices for communicating with other devices in the entity-resolution computing system 100, as described with respect to FIG. 1. The entity-resolution server 118 can include various devices for performing one or more transformation operations described above with respect to FIGS. 1-4.

The entity-resolution server 118 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The entity-resolution server 118 may also include a number of external or internal devices such as input or output devices. For example, the entity-resolution server 118 is shown with an input/output interface 508 that can receive input from input devices or provide output to output devices. A bus 506 can also be included in the entity-resolution server 118. The bus 506 can communicatively couple one or more components of the entity-resolution server 118.

The entity-resolution server 118 can execute program code that includes the entity-resolution service 120. The program code for the entity-resolution service 120 may be resident in any suitable computer-readable medium and may be executed on any suitable processing device. For example, as depicted in FIG. 5, the program code for the entity-resolution service 120 can reside in the memory 504 at the entity-resolution server 118. Executing the entity-resolution service 120 can configure the processor 502 to perform the operations described herein.

In some aspects, the entity-resolution server 118 can include one or more output devices. One example of an output device is the network interface device 510 depicted in FIG. 5. A network interface device 510 can include any device or group of devices suitable for establishing a wired or wireless data connection to one or more data networks described herein. Non-limiting examples of the network interface device 510 include an Ethernet network adapter, a modem, etc.

Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client-computing device that communicates with the entity-resolution server 118 using one or more data networks described herein. In other aspects, the presentation device 512 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. An entity-resolution computing system comprising:
   a non-transitory computer-readable medium having an identity data repository for storing account or transaction data regarding entities;
   an entity-resolution server configured for:
      correlating a first data object from the identity data repository with a second data object, each of the first data object and the second data object comprising a plurality of data fields obtained from the account or transaction data, wherein each data field of the plurality of data fields identifies an entity and wherein correlating the first data object with the second data object is based on the first data object and the second data object including a common data field,
      updating the identity data repository to form an updated data repository that includes an entity identifier that links the first data object to the second data object and that indicates that the first data object and the second data object refer to a common entity,
      creating an entity-resolution data structure that comprises the first data object with the entity identifier and the second data object with the entity identifier from the updated data repository,
      generating a new variant data object based on a modified version of the account or transaction data that is determined to match the common data field,
      updating the entity-resolution data structure to form an updated entity-resolution data structure by adding the new variant data object to the entity-resolution data structure, and
      generating an encrypted entity-resolution data structure by encrypting the updated entity-resolution data structure; and
   a client external-facing device configured for:
      transmitting, to a client computing system, the encrypted entity-resolution data structure for the client computing system to identify matching data stored in the encrypted entity-resolution data structure based on existing data objects within client data accessible to the client computing system.

2. The entity-resolution computing system of claim 1, wherein the entity-resolution server is further configured to generate a list of variants comprising variant objects from previously searched terms and generate the modified version of the account or transaction data from an object in the list of variants.

3. The entity-resolution computing system of claim 1, wherein the entity-resolution server is further configured to generate a list of variants comprising variant objects from at least one of convention, shorthand, slang of a spoken or written language, common misspellings or typing errors, and generate the modified version of the account or transaction data from an object in the list of variants.

4. The entity-resolution computing system of claim 1, wherein encrypting the updated entity-resolution data structure comprises generating an index for the updated entity-resolution data structure, and wherein the index comprises an identifying characteristic of an entity and is useable to match a data object with the updated entity-resolution data structure.

5. The entity-resolution computing system of claim 1, wherein the modified version of the account or transaction data is absent from the identity data repository.

6. The entity-resolution computing system of claim 1, wherein correlating the first data object with the second data object comprises correlating the first data object with the second data object based on a fuzzy matching technique.

7. An entity resolution server comprising:
a processor; and
a non-transitory computer-readable memory comprising:
  a data structure;
  a database engine to configure the data structure into an entity-resolution data structure by correlating data objects that refer to a common entity, each of the data objects comprising a plurality of data fields, wherein each data field of the plurality of data fields identifies an entity, the entity-resolution data structure comprising:
    a first data object;
    a second data object that includes a common data field from the first data object, wherein the first data object and the second data object refer to the common entity; and
    a variant data object comprising a modified version of a data field of the plurality of data fields that matches the common entity,
  wherein the database engine is further configured to perform operations comprising:
    updating an identity data repository containing account or transaction data from which the plurality of data fields of the data objects are obtained to form an updated identity data repository that includes an entity identifier that links the first data object to the second data object and that indicates that the first data object and the second data object refer to a common entity, wherein the entity-resolution data structure is created from the updated identity data repository; and
  instructions that are executable by the processor to cause the processor to perform operations comprising:
    generating an encrypted entity-resolution data structure by encrypting the entity-resolution data structure; and
    causing the encrypted entity-resolution data structure to be transmitted to a client computing system for the client computing system to identify matching data stored in the encrypted entity-resolution data structure based on existing data objects within client data accessible to the client computing system.

8. The entity resolution server of claim 7, wherein the operations further comprise:
generating a list of variants comprising variant objects from previously searched terms; and
generating the modified version of the data field from an object in the list of variants.

9. The entity resolution server of claim 7, wherein the operations further comprise:
generating a list of variants comprising variant objects from at least one of convention, shorthand, slang of a spoken or written language, common misspellings or typing errors; and generating the modified version of the data field from an object in the list of variants.

10. The entity resolution server of claim 7, wherein encrypting the entity-resolution data structure comprises generating an index for the entity-resolution data structure, and wherein the index comprises an identifying characteristic of an entity and is useable to match a data object with the entity-resolution data structure.

11. The entity resolution server of claim 7, wherein correlating data objects comprises correlating the data objects based on a fuzzy matching technique.

12. The entity resolution server of claim 7, wherein the modified version of the data field is absent from the identity data repository.

13. A method that includes one or more processing devices performing operations comprising:
correlating a first data object with a second data object from an identity data repository storing account or transaction data regarding entities, each of the first data object and the second data object comprising a plurality of data fields derived from the account or transaction data, wherein each data field of the plurality of data fields identifies an entity, and wherein correlating is performed based on the first data object and the second data object including a common data field;
updating the identity data repository to form an updated data repository that includes an entity identifier that links the first data object to the second data object and that indicates that the first data object and the second data object refer to a common entity;
creating an entity-resolution data structure having the first data object with the entity identifier and the second data object with the entity identifier from the updated data repository;
generating a new variant data object based on a modified version of the account or transaction data that is determined to match the common data field;
updating the entity-resolution data structure to form an updated entity-resolution data structure by adding the new variant data object to the entity-resolution data structure;
generating an encrypted entity-resolution data structure by encrypting the updated entity-resolution data structure; and
causing the encrypted entity-resolution data structure to be transmitted to a client computing system for the client computing system to identify matching data stored in the encrypted entity-resolution data structure based on existing data objects within client data accessible to the client computing system.

14. The method of claim 13, further comprising generating a list of variants comprising variant objects from previously searched terms and generating the modified version of the account or transaction data from an object in the list of variants.

15. The method of claim 13, further comprising generating a list of variants comprising variant objects from at least one of convention, shorthand, slang of a spoken or written language, common misspellings or typing errors, and generating the modified version of the account or transaction data from an object in the list of variants.

16. The method of claim 13, wherein correlating the first data object with the second data object comprises correlating the first data object with the second data object based on a fuzzy matching technique.

17. The method of claim 13, wherein encrypting the updated entity-resolution data structure comprises generating an index for the updated entity-resolution data structure, and wherein the index comprises an identifying characteristic of an entity and is useable to match a data object with the updated entity-resolution data structure.

18. The method of claim 13, wherein the modified version of the account or transaction data is absent from the identity data repository.

* * * * *